United States Patent [19]

Carpentier et al.

[11] Patent Number: 5,186,771
[45] Date of Patent: Feb. 16, 1993

[54] RING DEVICE FOR RUNNING WITH A FLAT TIRE

[75] Inventors: Eric Carpentier, Champagne S/Oise; Bruno Pelletier, Villers S/Saint Leu; Bernard Boni, Champagne Sur Oise, all of France

[73] Assignee: Hutchinson, Paris, France

[21] Appl. No.: 619,062

[22] Filed: Nov. 28, 1990

[30] Foreign Application Priority Data

Nov. 29, 1989 [FR] France ............................ 89 15700

[51] Int. Cl.⁵ ............................................ B60C 17/04
[52] U.S. Cl. .................................... 152/158; 152/520
[58] Field of Search ...................... 152/158, 516, 520

[56] References Cited

U.S. PATENT DOCUMENTS

| | | | |
|---|---|---|---|
| 2,989,108 | 6/1961 | Gore | 152/158 |
| 3,653,421 | 4/1972 | Johnson | |
| 3,828,836 | 8/1974 | Bradley | 152/158 |
| 3,942,571 | 3/1976 | Kraft | |
| 3,976,114 | 8/1976 | Pateull | 152/158 |
| 3,990,491 | 11/1976 | Hampshire et al. | 152/520 |
| 4,046,182 | 6/1977 | Farnsworth | 152/158 |

FOREIGN PATENT DOCUMENTS 2610249 8/1988 France .

Primary Examiner—Michael W. Ball
Assistant Examiner—Nancy T. Krawczyk
Attorney, Agent, or Firm—Bell, Seltzer, Park & Gibson

[57] ABSTRACT

A ring device for running with a flat tire and having articulated sectors is disclosed for a vehicle wheel equipped with a tubeless tire mounted on a one-piece rim with drop center, housed inside said tire and molding itself at least partially to the shape of the rim, the external surface of said ring being distant from the internal surface of the tread of the tire as long as the latter is in its normal operating condition, wherein said ring made from a composite material with a reinforced thermoplastic resin basis is formed so as to have in its part intended to come into contact with the rim drop center a stop lip for holding a bead of the tire in position, the other bead of which is subjected to the action of an elastomer wedge provided on the diametrical face of the ring opposite that carrying the stop lip, the articulated sectors being assembled together by mechanical fixing means providing positioning of the assembly of the ring and its component parts (elastomer wedge and stop lip) during actuation thereof.

6 Claims, 4 Drawing Sheets

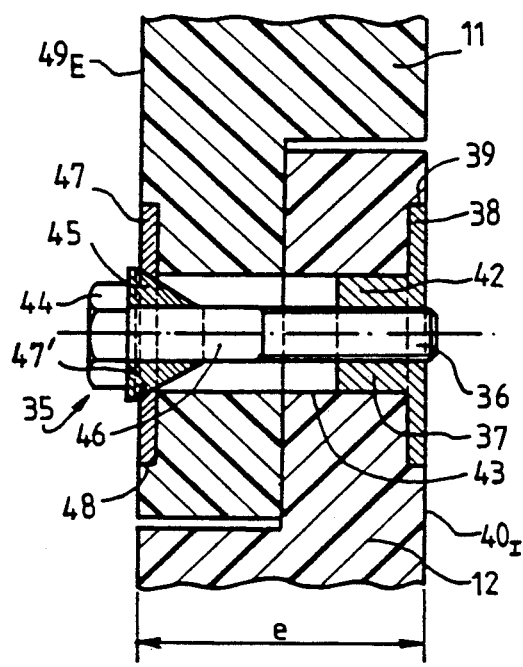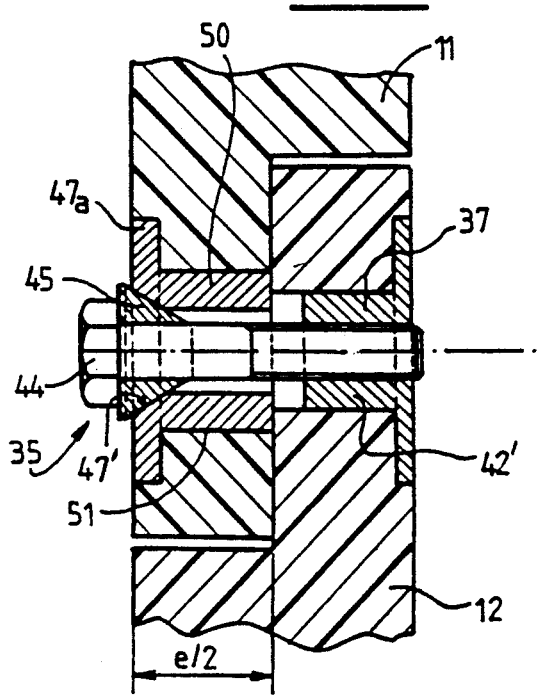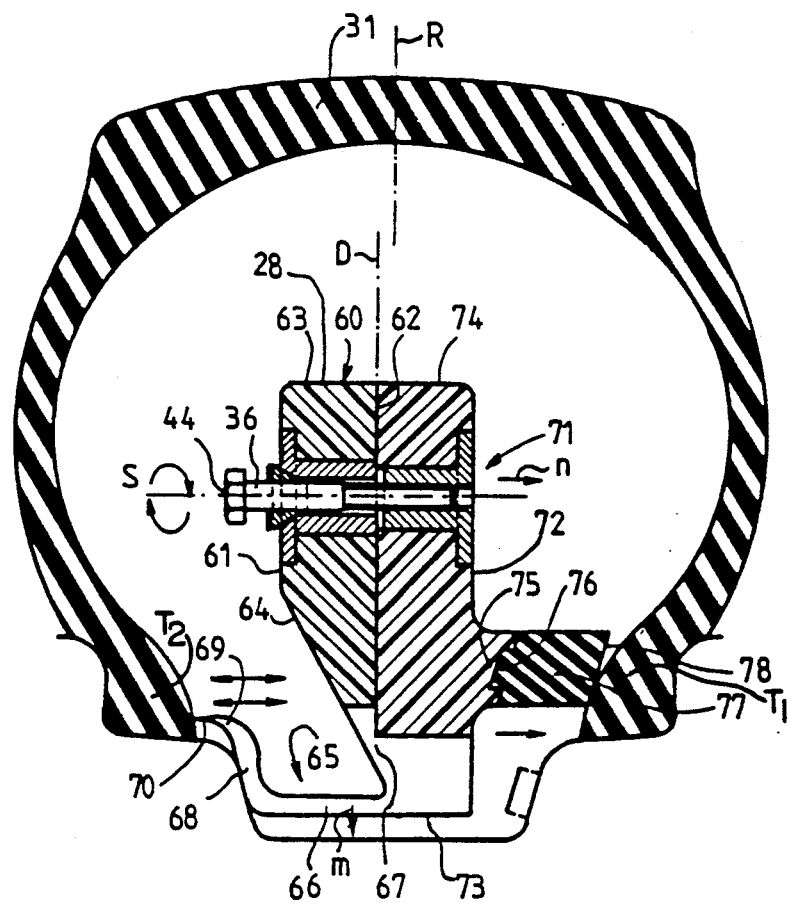

RING DEVICE FOR RUNNING WITH A FLAT TIRE

BACKGROUND OF THE INVENTION

The invention relates to a ring device for running with a flat tire.

FIELD OF THE INVENTION

Different constructions of devices for running with a flat tire are already known, namely devices which, placed inside a tubeless tire mounted on a rim, enable the vehicle of which they equip the wheels to continue travelling satisfactorily should a partial or total loss of the inflation pressure occur. Such devices find an application for the wheels of vehicles travelling in zones where running is difficult or dangerous and for which a certain mobility must be maintained under all circumstances, whether the loss of inflation is due to an accidental blow-out or caused purposely.

The conditions which such devices must fulfil are both severe and contradictory. It is in fact important, at the time of a blow-out or even a partial drop of the inflation pressure of a tire:

to prevent the beads of the tire from separating from their seat on the rim, whether this latter is of the flat, removable or non removable type or else has a well or drop center;

to prevent the tire tread which comes into contact with the device from being too rapidly damaged by punching.

to keep for the wheels as good as possible damping characteristics while avoiding overheating which tends to occur when the device comprises or is primarily made of flexible elastomer materials.

To these conditions, which may be termed mechanical ones and which are due running with a flat tire, is added the need for the device to be easy to fit and remove, without specialized tools, in particular for devices intended to equip one-piece non removable drop center rims.

DESCRIPTION OF THE PRIOR ART

Among the devices proposed for complying with the above conditions, there may be mentioned those in which a ring enabling running with a flat tire is formed by the assembly of arcuate parts having coupling means at each of their ends, as described in FR-A-2 160 265 or FR-A-2 610 249 or those described in FR-A-2 383 031 in which the running flat ring is an annular element made in a single piece split at a point of its circumference so as to have end portions which are movable with respect to each other. In the first of these documents, the coupling means are of the male-female type completed by bolts ensuring circumferential clamping when they are actuated, whereas in the third of the documents mentioned the coupling means are of the type with interpenetrating profiles with pin and/or detent pawl means. A device according to the first or third of the above documents is provided for equipping vehicles travelling at speeds of about 110 to 130 km/h.

If it is desired to equip the wheels of vehicles travelling at higher speeds than those mentioned above, for example up to 200–250 km/h, with rings for running with a flat tire, then the problem arises of providing a device satisfying all the above mentioned conditions.

SUMMARY OF THE INVENTION

It is consequently a general object of the invention to provide a device of the ring type for running with a flat tire for equipping a vehicle wheel likely to travel at high speeds and having a tubeless tire mounted on the wheel rim which limits the collapse of the tire in the case of a blow-out, so that rapid damage of the beads of the tire may be avoided and which enables the vehicle to travel over several tens of kilometers while keeping the tire on the wheel.

It is also an object of the invention to provide such a device which is able to withstand, under the best conditions when travelling with a flat tire, the load of the vehicle, without shearing the tread of the tire by applying too high a pressure thereto and without premature damage occurring through internal overheating.

A further object of the invention is to provide such a device which is sufficiently flexible so as not to generate appreciable mechanical vibrations, when running with a flat tire, thus guaranteeing that the vehicle can be driven under good safety conditions, notwithstanding the blow-out of the tire equipped with the device.

A final object of the invention is to provide such a device for equipping the wheels of civil or military vehicles likely to be attacked by bullets, namely a device which is as insensitive as possible to the impact of said bullets.

These objects are attained according to the invention, in a running flat ring device with articulated sectors for a vehicle wheel equipped with a tubeless tire mounted on a one-piece rim with drop center, housed inside said tire and matching at least partially to the shape of the rim, the external surface of said ring being distant from the internal surface of the tread of the tire as long as the latter is in its normal operating condition, said ring being primarily made from a composite material with a reinforced thermoplastic resin and shaped so as to have in its part intended to come into contact with the rim a stop lip for holding a first bead of the tire in position, the second bead being subjected to the action of an elastomer beadlock provided on the diametrical face of the ring opposite that carrying the stop lip, the articulated sectors being assembled together by means of mechanical fixing means providing positioning of the assembly of the ring and its component parts (elastomer beadlock and stop lip) during actuation thereof.

According to another characteristic of the invention, the thermoplastic resin making the material forming the ring is chosen from the family of RIM (reaction injection molded) sequenced polyamides and it is reinforced with glass fiber reinforcements, thus providing a material having very good mechanical characteristics of tensile and compression strength, a very good fatigue resistance, as well as resistance to overheating, shocks and bullet impacts.

The presence of glass fibers as reinforcements of the composite material give to this latter a coefficient of expansion which is significantly lower than that of the thermoplastic resin alone, on the one hand, whereas the increase in the mechanical strength characteristics makes it possible, on the other hand, to reduce the cross sections of the stop lip and of the parts which are adjacent thereto, with consequently a great facility of fitting the device and the tire on the rim.

Such an increase in the mechanical strength characteristics further reinforces the assembly zones of the component sectors of the ring.

The elastomer beadlock provided for exerting a compression force on one of the beads of the tire must also be able to absorb the tolerances of internal width of the wheel and thickness of said beads and, according to another characteristic, of the invention, the elastomer forming said beadlock is advantageously chosen from the family of very flexible rubbers with a good remanent hardness characteristic under compression, advantage being taken of the flexibility of the rubber so that the force induced by compression of the beadlock is as independent as possible of the width of the wheel which, by its very construction, has tolerances of internal width of about +/−3 mm for diameters of 14, 15 and 16 inches and of +/−5 mm for diameters of 20 inches.

In a particularly advantageous embodiment of the invention, the integrated stop lip, forming an integral part of each of the sectors of the ring, has a cross section somewhat in the form of a   with a base connected to the body of the ring properly speaking and a wing intended to come into contact with a bead of the tire for preventing the latter from moving laterally on the rim when running with a flat tire, thus improving the pulling power of the vehicle in this configuration with good roadholding, while making removal of the tire casing possible without damaging said stop lip.

In order that the assembly of the sectors of the ring be only little or not deformed at all, including at high speeds of the vehicle, of about 220 km/h, and in order consequently to guarantee satisfactory operation of the device at these speeds, the invention provides for the mechanical fixing means for the sectors, in particular the screws, to be made from a high tensile material, advantageously a stainless steel with a tensile strength of 100 daN/mm$^2$, on the one hand, and to increase the charge of glass fiber or similar reinforcements in the composite material forming the sectors of the ring in the assembly zones, on the other hand, so as to locally increase the mechanical tensile, shearing and flexion characteristics of said composite material.

According to another characteristic of the invention, one or more eccentric washers are associated with said mechanical fixing means whose role is to absorb the dimensional tolerances of the drop center of the rim on which the device is mounted.

The presence of one or more eccentric washers further enables the component sectors of the ring to be clamped on the rim, during actuation of the mechanical fixing means, thus preventing veering of the device and the appearance of a possible unbalance unfavorable to correct operation.

To cause the movement of the eccentric washer(s), the invention provides, most simply, to associate with each screw assembling the ends of sectors together a clamping cone adapted to cooperate with a surface of the same conicity of the eccentric washer(s) fixed by drive screws on a diametrical face of each sector of the ring.

BRIEF DESCRIPTION OF THE DRAWINGS

The invention will be well understood from the following description, given by way of example, with reference to the accompanying drawings in which:

FIG. 5 is a view similar to that of FIG. 2, but on a larger scale of a part of the device according to the invention;

FIG. 6 is a view similar to that of FIG. 5 but for a variant of construction; and FIG. 7 is a view similar to that of FIG. 3 illustrating the use of a device according to the invention.

DESCRIPTION OF THE PREFERRED EMBODIMENTS

Figure 1:
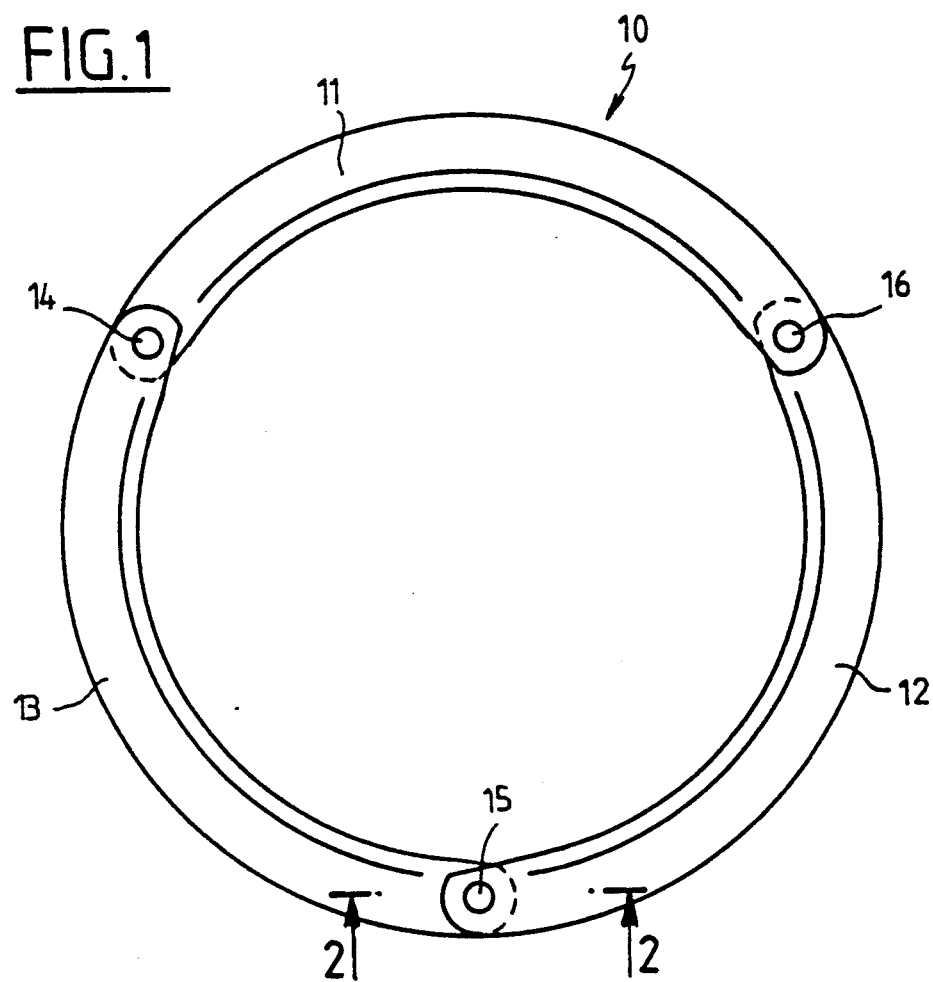
FIG. 1 is an elevational view of a ring device for running with a flat tire in accordance with the invention.

A ring device 10 for running with a flat tire in accordance with the invention comprises essentially —in the embodiment described and shown—three sectors 11, 12, 13 shaped as arcs of a circle and articulated at their respective ends about pins 14, 15 and 16. Sectors 11, 12 and 13 are made from a composite material primarily a reinforced thermoplastic resin, as will be discussed hereafter. The device is provided for being housed inside a tubeless tire 20 mounted on a wheel rim 21 of the one-piece type, i.e. comprising a drop center 22 adjacent a first cylindrical portion 23 extended towards the inside I of the wheel by a truncated cone shaped portion 24 opposite which, on the external portion E of the wheel, a second truncated cone shaped portion 25 is provided directly adjacent the drop center 22. The truncated cone shaped portions 24 and 25 are bordered, outwardly of the rim, by shoulders 26 and 27, respectively, which serve as bearing surface for the beads $T_1$ and $T_2$ of tire 20.

Figure 2:
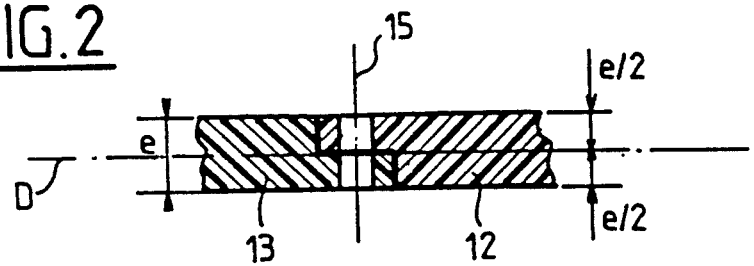
FIG. 2 is a very schematic view in section through line 2—2 of FIG. 1.
Figure 3:
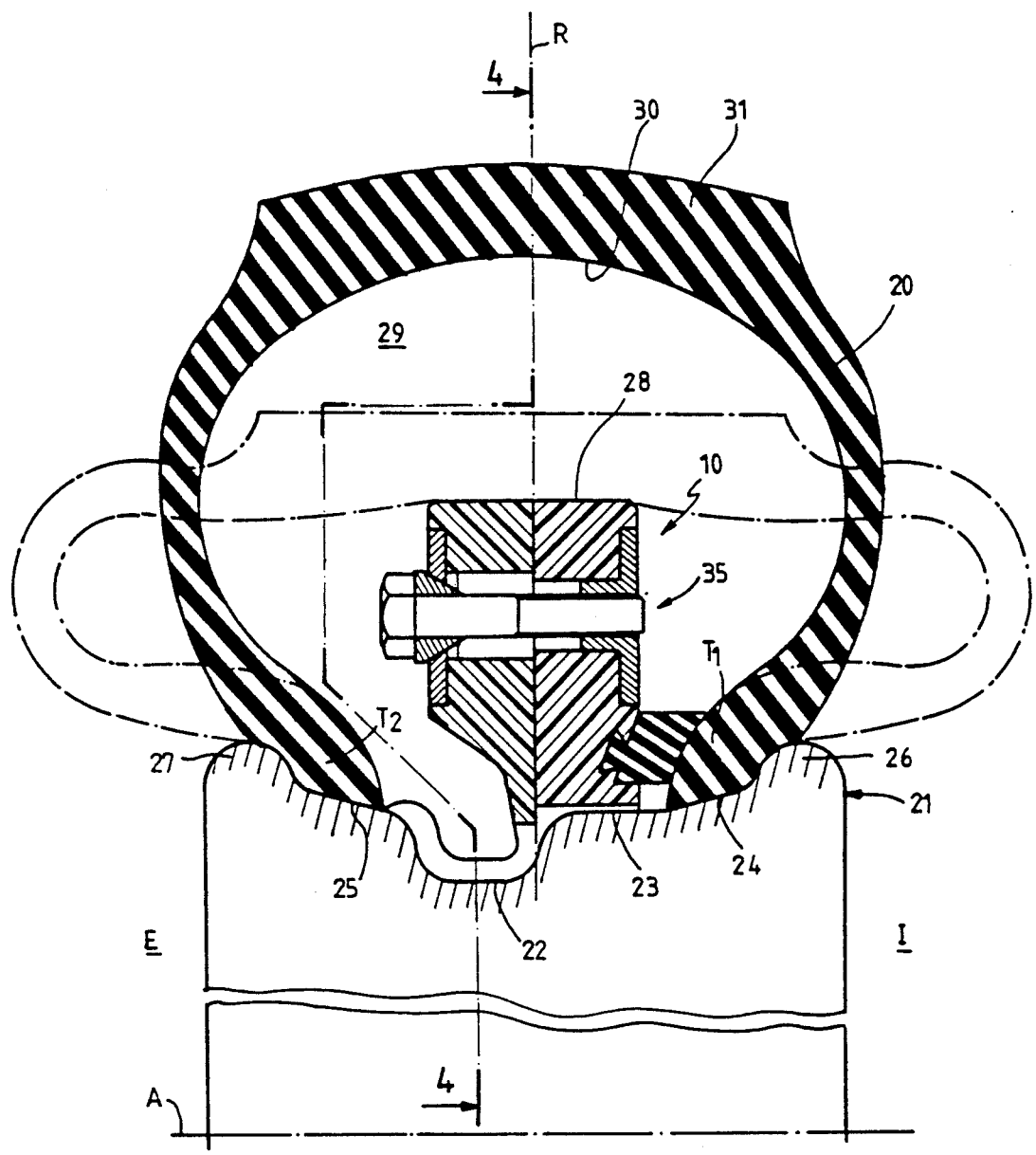
FIG. 3 is a radial sectional view of a wheel portion equipped with a device according to the invention.
Figure 4:
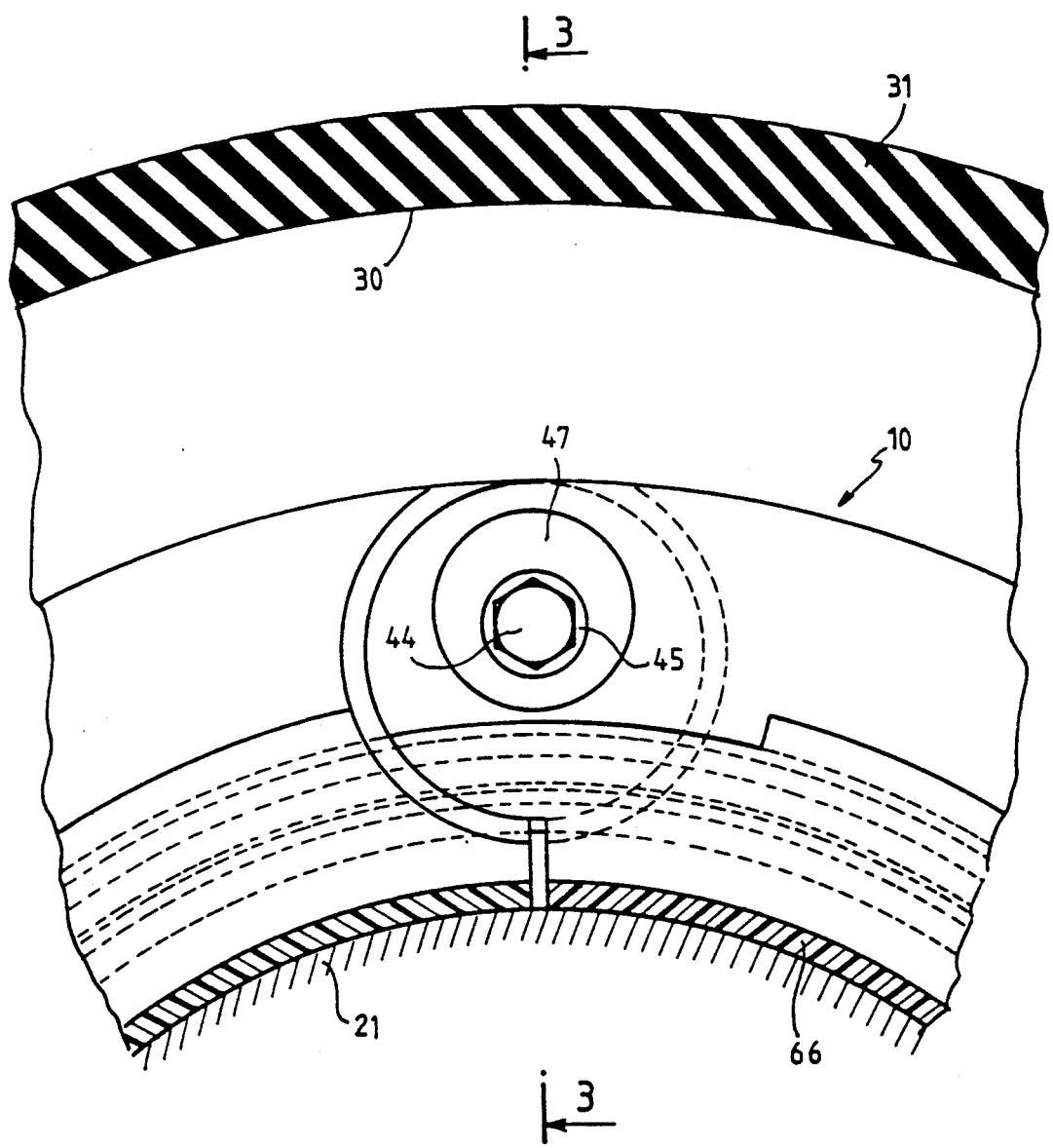
FIG. 4 is a partial sectional view through the broken line 4—4 of FIG. 3.

As can be clearly seen in FIG. 3, each of the sectors 11, 12, 13 forming the device 10 is intended to serve, by its largest diameter surface 28, as a support for the internal surface 30 of the tread 31 of the tire in the case of a blow-out, i.e. for the condition shown with a chain dotted line in this figure and the external diameter of this surface 28 is, for this reason, substantially equal to the mean diameter of toroidal chamber 25 between rim 21 and the largest diameter of the tire. Each sector 11, 12 and 13 has a constant cross section over substantially the whole of its angular extent except for its ends where, as can be seen in FIGS. 2 and 3, the thickness of each sector of the ring is of the order of e/2 if we designate by e the thickness of the body of the ring in its operating portion, namely the dimension of its surface 28 measured parallel to the axis A of the wheel.

The articulation between, and assembly of, the three sectors 11, 12, 13 each having an angular extent of about 120° (or in a modification with two sectors having an angular extent of 180° each) are provided by mechanical fixing means better shown in FIGS. 5 and 6. Said means 35, provided for guaranteeing safety of the assembly including at speeds of the vehicle of about 220 km/h, and consequently at a high rotational speed corresponding to a considerable centrifugal force component, comprise a screw 36 made from a stainless steel with high tensile strength (of the order of 100 daN/mm$^2$) and the flexion of which is thus limited. Screw 36 is adapted to cooperate with nut 37 whose flat head 38 is housed in a recess 39 in the inner diametrical face $41_1$ of sector 12 (for example) where it is fixed by drive screws (not shown) whereas the body 42 of nut 37 is housed in a bore 43 in the portion of thickness e/2 of said sector, said portion having in the vicinity of said bore a higher density of reinforcements, for example glass fibers, than in the rest of the sector for locally increasing the mechanical tensile, shearing and flexion characteristics of the device.

On the smooth part 46 of screw 36, adapted to be operated by its head with flats 44, is fitted a clamping cone 45 for cooperating with a surface 47' having the same conicity of an eccentric washer 47 housed in a recess 48 in the external diametrical face 49E of the sector assembled with sector 12, for example here sector 11.

In the modification shown in FIG. 6, the structure locally reinforced with glass fibers of the composite material forming the sectors 11 and 12 is similar to that which has just been described above and the same goes for the general organisation of the mechanical fixing means, with the reservation that the clamping cone 45 cooperates with a conical surface 47' formed on an eccentric washer 47a, thicker than washer 47 and integral with a socket 50 housed in a through bore 51 in the thinnest portion e/2 of sector 11. In this embodiment, also, the total height of nut 42' is greater than that of the nut of the embodiment of FIG. 5.

As can be seen in FIGS. 3 and 7, the cross section of sectors 11, 12, 13 forming the ring device 10 is dissymmetric with respect to the mean diametrical plane shown by phantom line D merging with the diametrical plane R of the wheel when the ring is mounted on the rim. In the space portion corresponding to the external zone E of the wheel, each sector is formed, except for its ends which have been described above, as a bulb 60 with a cross section approximately in the form of a rectangular trapezium and thus limited—in the plane of FIGS. 3 and 7—by two substantially parallel edges 61 and 62—the latter forming as it were the base of largest dimension of the trapezium—and two edges 63 and 64, the first defining the external surface 28 of the bulb 60 and the second being inclined with respect to edge 62 by an angle of about 45°. Adjacent this bulb 60, is provided a portion 65 also of revolution about an axis merging with the axis A of the wheel when the ring device is in position, and whose cross section is somewhat in the shape of a    with a base 66 connected to the apex 67 of the above described trapezium and a wing 68 whose end distant from base 66 is formed as a lip 69 tapering in the vicinity of its free edge 70.

As can be seen in FIG. 7—which shows the device during fitting, i.e. before it has taken its final position with respect to rim 21—the cross section of portion 65 mates with that of the drop center 22 and the portions which are directly adjacent thereto, so as to form a stop for holding the external bead $T_2$ of the tire in position and preventing it from moving laterally on the rim when running with a flat tire, so as to improve the pulling power in this configuration and ensure good road-holding, while making it possible to remove the tire casing without damaging said stop.

In the inner space portion I, defined by the mean diametrical plane shown by phantom line D, the cross section of the toroidal bulb 60 is substantially rectangular, limited in the plane of FIGS. 3 and 7 by two parallel edges 62 and 72 and two edges, also parallel but perpendicular to the first ones, referenced 73 and 74, the first in the extension of the base 63 of stop 65 and the second in the extension of edge 63 defining the external surface 28 of the sectors forming ring 10. On the diametrical face 71 defined by edge 72 of bulb 60, and closer to edge 73 than edge 74, said face 71 is shaped as a rib 75 whose free dovetail face 76 receives the face of mating shape of an annular wedge or beadlock 77 whose face 78—opposite face 76—has a slight conicity with respect to axis A of the wheel with dimensions, in particular a width measured parallel to the axis A of the wheel, which is slightly greater than the space which is offered to it, when the ring is in position, for being housed between face 71 and the internal face of bead $T_1$ of tire 20.

In accordance with the invention, and as mentioned above, sectors 11, 12, 13 are made primarily from a composite material with a thermoplastic resin incorporating glass fiber reinforcements. Particularly advantageous results have been obtained by choosing the thermoplastic resin from the family of RIM (reaction injection molded) sequenced polyamides, a non limitative example of an appropriate material being that known under the commercial name of Nyrim (a trademark registered by the firm DSM France). The use of such a material enables a ring 10 to be obtained having very good mechanical strength characteristics, both tensile and under compression, a very good fatigue resistance and resistance to thermal effects, as well excellent resistance to shocks and possible bullet impacts. The presence of the glass fibers enables an expansion coefficient of the material to be obtained which is close to that of aluminium. Furthermore, the fact for the invention to locally modify the glass fiber reinforcement concentration, either in the end zones of the sectors for assembly of said sectors together, or in the integrated part 65 forming the stop for the ring device, makes it possible to increase the mechanical, tensile, flexion and/or shearing strength in the vicinity of the fixing zones and also the modulus and the flexion resistance of the stop, which characteristics enable the casing 20 of the tire to be removed without damaging said stop.

To use a device according to the invention one first places the bead $T_1$ on the rim, in contact with shoulder 26, and then the ring device 10 into the tire casing, the two sectors of this device being connected loosely together and the condition then being that shown in FIG. 7. When, from this configuration, the screws 36 are tightened by means of the flatted heads 44, as illustrated schematically by the circular arrow S, the ring device moves both towards the rim 21, as shown by arrow m and in the direction shown by the arrows n, which tends to bring the mean diametrical plane D of the ring into the mean diametrical plane R of the rim and of the wheel. During this movement, due to the cooperation of the clamping cone 45 with the eccentric washers 47 or 47a of the mechanical fixing means, ring 10 is clamped on the rim, on the one hand, the stop 65 is brought in position, on the other hand, whereas the annular wedge 77 the material of which is chosen from a family of very flexible rubber elastomers with good remanent hardness under compression is compressed against the bead $T_1$ of the tire, until it takes the form and position shown in FIG. 3. The compression force then exerted by the wedge or beadlock 77 guarantees that the pulling power of the vehicle is not lost, at the time of a blow-out, namely when running with a flat tire, since bead $T_1$ is firmly held against the shoulder of the rim and, after positioning of portion 65, bead $T_2$ is held in position by lip 69.

The choice for the annular wedge or beadlock 77 of material such as defined above further makes it possible to take into account the manufacturing tolerances of wheel rims, which tolerances may be of the order of $+/-$ 3 mm for an inner dimension of a rim having a diameter of 14, 15 or 16 inches and even greater, of the order of +/− 5 mm for a diameter of 20 inches. The fact that the mechanical fixing means are provided by eccentric washers enabling the use of the same device for wheels whose nominal dimension varies within the above indicated limits, also contributes to accomodating these tolerances.

After fixing ring 10 on rim 21 by the above mentioned means, which fixing prevents unscrewing of the device and consequently the appearance of an unfavorable unbalance, the other bead of the tire T$_2$ is positioned then the inflation pressure is applied and the wheel fitted on the vehicle which it is to equip.

Tests carried out on a vehicle whose wheels were equipped with devices such as described above have enabled satisfactory mobility of the vehicle to be maintained after a blow-out caused to the tires of the vehicle travelling at a speed of about 200/220 km/h.

What is claimed is

1. A ring device for a vehicle wheel equipped with a tubeless tire mounted on a one-piece rim with drop center, housed inside said tire and enabling running upon deflation of said tire, said device comprising a plurality of articulated sectors matching at least partially to the shape of the rim, the radially outermost external surface of said ring being distant from the internal surface of the tread of the tire as long as the latter is in its normal operating condition, wherein said ring is made from a composite material of reinforced thermoplastic resin shaped so as to have a base portion positioned to come into contact with the rim drop center and a stop lip extending from the base portion and positioned for holding a first bead of the tire in position, the other bead of the tire being subjected to the action of an elastomer made beadlock provided on the diametrical face of the ring opposite that carrying the stop lip, the articulated sectors being assembled together by mechanical fixing means providing positioning of the assembly of the ring and during actuation thereof.

2. The device as claimed in claim 1, wherein the sectors are made from a composite material whose thermoplastic resin is a reaction injection molded sequenced polyamide and incorporates glass fiber reinforcements, for providing a material having very good mechanical characteristics of tensile and compression strength, a very good fatigue resistance, as well as resistance to overheating, shocks and bullet impacts.

3. The device as claimed in claim 1, wherein said elastomer beadlock provided for exerting a compression force on one of the beads of the tire is made of a very flexible rubber, said rubber having a good hardness characteristic under compression.

4. The device as claimed in claim 1, wherein said stop lip forms an integral part of each of the sectors of the ring, has a base connected to the body of the ring and a lip portion intended to come into contact with a bead of the tire for preventing the latter from moving laterally on the rim when running with a flat tire.

5. The device as claimed in claim 1, wherein said mechanical fixing means for the sectors comprise screws made from a high tensile strength material with a tensile strength of 100 daN/mm$^2$, and the composite material forming the sectors of the ring comprises glass fiber reinforcements having a density which is greater in the vicinity of said screws than in the rest of the sector so as to increase the mechanical tensile, shearing and flexion characteristics of said composite material.

6. The device as claimed in claim 1, wherein said mechanical fixing means comprise at least one eccentric washer with which cooperates a clamping cone fitted on a screw.

* * * * *